D. J. ORTON.
CULTIVATOR FENDER.
APPLICATION FILED APR. 15, 1912.

1,037,654.

Patented Sept. 3, 1912.

2 SHEETS—SHEET 1.

Witnesses
L. B. James
C. E. Hunt

Inventor
D. J. Orton by H. B. Willson & Co.
Attorneys

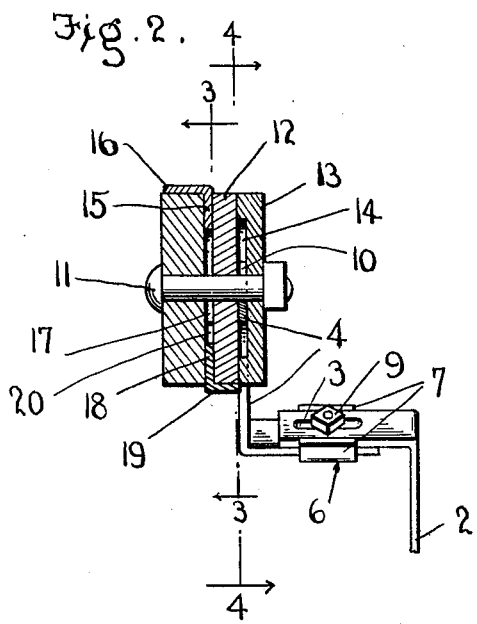
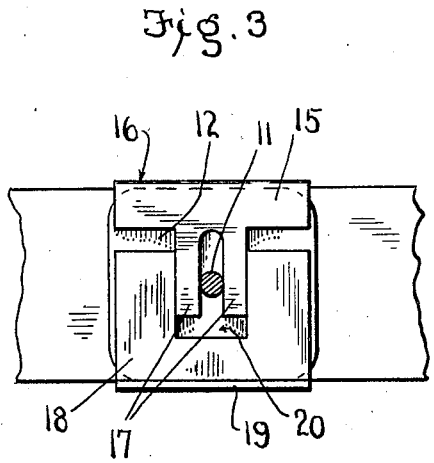
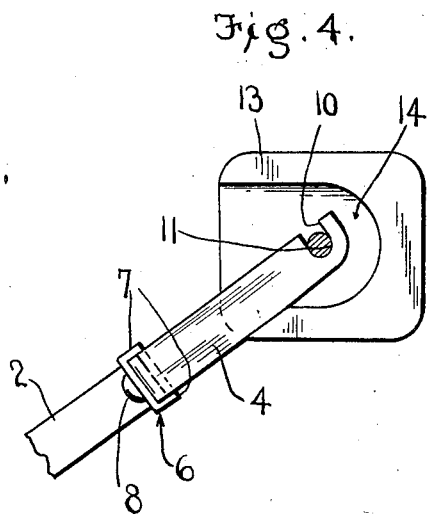
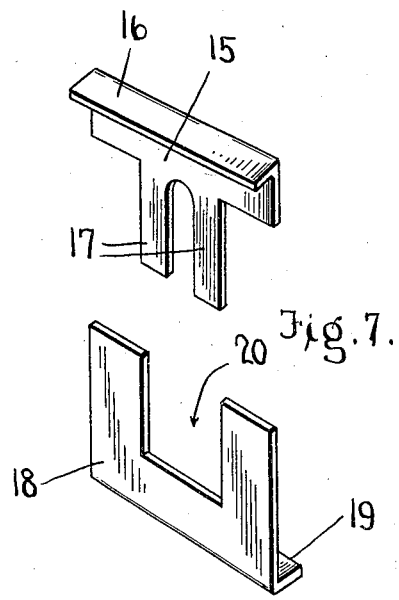

ns.

UNITED STATES PATENT OFFICE.

DANIEL J. ORTON, OF SAC CITY, IOWA.

CULTIVATOR-FENDER.

1,037,654.  Specification of Letters Patent.  Patented Sept. 3, 1912.

Application filed April 15, 1912. Serial No. 690,829.

*To all whom it may concern:*

Be it known that I, DANIEL J. ORTON, a citizen of the United States, residing at Sac City, in the county of Sac and State of Iowa, have invented certain new and useful Improvements in Cultivator-Fenders; and I do declare the following to be a full, clear, and exact description of the invention, such as will enable others skilled in the art to which it appertains to make and use the same.

This invention relates to improvements in fenders or shields for cultivators.

One object of the invention is to provide a shield or fender of this character having an improved means for attaching the same to the beam of a cultivator whereby the fender may be readily removed when desired without the use of tools.

Another object is to provide a fender attachment for cultivators having means whereby the fender blades may be adjusted laterally to a greater or less distance from the cultivator blade or shovel.

With these and other objects in view, the invention consists of certain novel features of construction, and the combination and arrangement of parts as will be more fully described and claimed.

Figure 1:
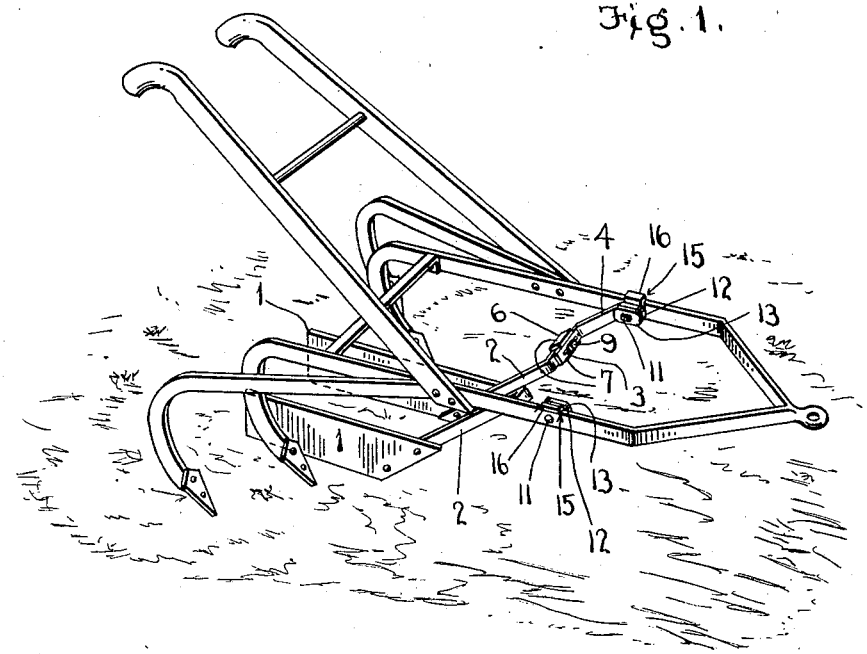
Figure 5:
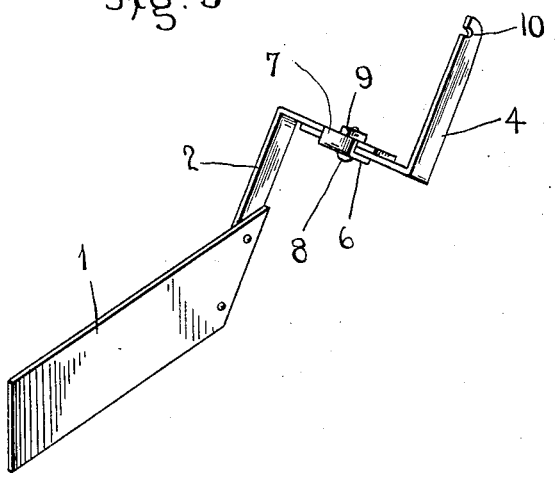
Figure 6:
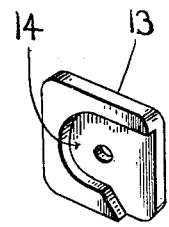

In the accompanying drawings, Figure 1 is a perspective view of a cultivator showing the invention applied thereto; Fig. 2 is a cross sectional view through one beam of the cultivator and through the attaching mechanism of the fender; Fig. 3 is a vertical sectional view through the fender attaching mechanism taken on the line 3—3 of Fig. 2. Fig. 4 is a similar view taken on the line 4—4 of Fig. 2; Fig. 5 is a detail perspective view of one of the fender blades removed from the plow; Fig. 6 is a detail perspective view of one of the outer clamping plates of the fender attaching mechanism; Fig. 7 is a similar view of the adjustable beam engaging and clamp supporting plates.

My improved shield or fender comprises a pair of blades 1 which may be of any suitable size and shape and which are here shown as being of rectangular oblong shape and as having their forward ends formed at an angle from the lower toward the upper edge of the blade. To the forward ends of the blades are connected the lower sections 2 of blade attaching shanks. The lower sections 2 of the shanks are arranged on and project upwardly from the forward ends of the blades at a suitable angle and the upper or inner ends of said sections are bent at substantially right angles and in said right angularly bent ends are formed longitudinally disposed slots 3. The upper section 4 of the blade attaching shanks have their inner ends bent at right angles and provided with longitudinal slots 5. The slotted ends of the upper section of the shanks overlap and have an adjustable connection with each other to permit the blades to be shifted laterally. The adjustable connection between the overlapping ends of the shanks is effected by means of a guide plate 6 engaged with one side of one of the ends of the shanks and having its edges bent at right angles to form flanges 7 which engage the edges of the overlapping ends of the shanks and hold said ends in alinement. Inserted through the plate 6 and through the slots 5 in the overlapping ends of the shank sections is a clamping bolt 8 having a nut 9 which when tightened up on the bolt securely clamps the overlapping ends of the shanks together and thereby hold the same in their adjusted position. In the upper edges of the forward ends of the upper sections 4 of the shanks are shank attaching notches 10 the purpose of which will be hereinafter described.

Secured to opposite sides of the cultivator beam by a transversely disposed clamping bolt 11 are fender attaching devices each of which comprises an inner plate 12 and an outer plate 13, said outer plate having its inner side recessed as shown at 14 to form between the same and the outer side of the inner plate a space of sufficient width to admit the notched end of the upper section 4 of the fender shank. The notched ends of the shanks when inserted in the space formed by the recess 14 are engaged with the adjacent portions of the bolt 11 and are thereby detachably secured to the cultivator beam. By attaching the shanks of the fender to the plow beam in the manner described, it will be seen that it is simply necessary to swing the fenders upwardly to disengage the notched ends of the shanks from the bolt 11. It will also be understood that the engagement of the fender shanks with the bolt 11 is effected by reversing the detaching operation.

By means of the attaching mechanism shown and described the fenders may be readily engaged with and removed from the cultivator without the use of tools of any kind.

In order to hold the attaching plates in proper position and to prevent the sagging of the fender, I provide a plate holding mechanism comprising an upper beam engaging plate or member 15 having on its upper edge an inwardly projecting right angular flange 16 which projects over or engages the upper side of the plow beam and has on its inner edge a pair of centrally disposed lugs 17 adapted to fit over and engage the opposite sides of the bolt 11. Coacting with the upper plate or member 15 is a lower plate or member 18 having on its lower edge an outwardly projecting right angular stop flange 19 which engages the lower edge of the inner end attaching plate 12. In the upper edge of the plate 18 is a rectangular notch 20 of sufficient width to receive the lugs 17 on the upper plate, said lugs having a close sliding engagement with the notch 20 as shown. By constructing the plates 15 and 18 in the manner described it will be seen that said plates may be adjusted to permit the same to be employed in connection with plow beams of different width. When these plates are arranged in the manner described the engagement of the flanges on the outer edges thereof with the upper side of the beam and with the lower edges of the fender attaching plates, said plates will be prevented from turning on the bolt 11 and will thus hold the fenders in proper position.

By forming the shanks of the fenders in adjustably connected sections, as herein shown and described it will be seen that the fender blades may be readily adjusted toward or from the blade or shovel of the cultivator, thus permitting the fender to be effectively employed when the cultivator is used for working very small corn or other plants or large plants of corn.

From the foregoing description taken in connection with the accompanying drawings, the construction and operation of the invention will be readily understood without requiring a more extended explanation.

Various changes in the form, proportion and the minor details of construction may be resorted to without departing from the principle or sacrificing any of the advantages of the invention as shown.

Having thus described my invention, what I claim is;

1. A fender for cultivators comprising a pair of blades, attaching shanks secured at their lower ends to said blades and having in their upper ends attaching notches, fender attaching plates arranged on the cultivator beam, a bolt arranged through said beam and plates whereby the latter are secured together and to the beam, said plates being spaced apart to receive the notched upper end of the shank whereby said end is adapted to be detachably engaged with said bolt, and means to hold said attaching plates in position for supporting the fenders.

2. A fender for cultivators comprising a pair of fender blades, attaching shanks formed in upper and lower adjustably connected sections, said lower sections having their lower ends secured to the fender blades and said upper sections having in their upper ends attaching notches, said sections having their inner ends slotted and bent at right angles, means to secure the slotted right angularly bent inner ends of said shank sections together whereby the fender blades may be shifted laterally toward and from the shovel of the cultivator and attaching devices secured to the beam of the cultivator and adapted to receive the notched upper ends of said fenders whereby the latter and the fender blades are detachably secured to the cultivator beam.

3. A fender for cultivators comprising a pair of fender blades, attaching shanks formed in upper and lower adjustably connected sections, said lower sections having their lower ends secured to the fender blades and said upper sections having in their upper ends attaching notches, said sections having their inner ends slotted and bent at right angles, a guide plate having flanges adapted to engage the edges of the slotted right angular inner ends of the shank sections, a clamping bolt arranged through said plate and through said slotted ends of the sections whereby they are adjustably connected and held in alinement to permit the fender blades to be adjusted toward or from the shovel of the cultivator, attaching devices secured to the cultivator beam, and means whereby the fender shanks are detachably connected with said attaching devices.

4. A fender for cultivators comprising a pair of blades, attaching shanks secured thereto and having in their upper ends attaching notches, pairs of fender attaching plates one of which has its inner side recessed to form between said plates a shank receiving space, a bolt arranged through said plates and through the beam of the cultivator whereby the plates are secured together and to the beam, upper and lower plate holding members having on their upper edges beam engaging flanges, and on their lower edges bolt engaging lugs adapted to engage the plate fastening bolt, said lower members having on their lower edges flanges adapted to engage the lower edges of the fender attaching plates and having in their lower edges rectangular notches adapted to receive the lugs on the lower edges of the upper members whereby said members have an interlocking engagement and thereby hold the fender attaching plates against turning on their attaching bolt.

In testimony whereof I have hereunto set my hand in presence of two subscribing witnesses.

DANIEL J. ORTON.

Witnesses:
CHAS. D. GOLDSMITH,
J. M. HENDRICKS.

Copies of this patent may be obtained for five cents each, by addressing the "Commissioner of Patents, Washington, D. C."